(12) United States Patent
Smith et al.

(10) Patent No.: US 9,912,207 B2
(45) Date of Patent: Mar. 6, 2018

(54) ELECTRICAL MACHINE HOUSING AND METHODS OF ASSEMBLING THE SAME

(71) Applicant: Regal Beloit America, Inc., Beloit, WI (US)

(72) Inventors: Michael David Smith, Rogers, AR (US); Jay Matthew Cupps, Cassville, MO (US)

(73) Assignee: Regal Beloit America, Inc., Beloit, WI (US)

( * ) Notice: Subject to any disclaimer, the term of this patent is extended or adjusted under 35 U.S.C. 154(b) by 396 days.

(21) Appl. No.: 14/665,164

(22) Filed: Mar. 23, 2015

(65) Prior Publication Data

US 2016/0285339 A1 Sep. 29, 2016

(51) Int. Cl.

| | |
|---|---|
| *H02K 5/16* | (2006.01) |
| *H02K 5/20* | (2006.01) |
| *H02K 9/06* | (2006.01) |
| *H02K 9/16* | (2006.01) |
| *H02K 11/33* | (2016.01) |
| *H02K 5/10* | (2006.01) |
| *H02K 5/22* | (2006.01) |
| *H02K 11/30* | (2016.01) |

(52) U.S. Cl.
CPC ............... *H02K 5/20* (2013.01); *H02K 5/10* (2013.01); *H02K 5/22* (2013.01); *H02K 9/06* (2013.01); *H02K 9/16* (2013.01); *H02K 11/30* (2016.01); *H02K 11/33* (2016.01)

(58) Field of Classification Search
CPC .. H02K 5/22; H02K 5/20; H02K 9/06; H02K 9/16; H02K 11/33; H02K 11/30

USPC .......................... 310/52, 54, 58, 64, 67 R, 89
See application file for complete search history.

(56) References Cited

U.S. PATENT DOCUMENTS

| | | | |
|---|---|---|---|
| 3,969,043 A * | 7/1976 | Bright | F04D 13/06 |
| | | | 310/54 |
| 7,265,468 B1 * | 9/2007 | Mancl | H02K 5/10 |
| | | | 310/54 |
| 7,453,696 B2 | 11/2008 | Tungl et al. | |
| 7,780,405 B2 | 8/2010 | Araki | |
| 8,267,674 B2 * | 9/2012 | Czulak | F04D 25/082 |
| | | | 417/370 |
| 2002/0180285 A1 * | 12/2002 | Machiroutu | H02K 3/24 |
| | | | 310/54 |

(Continued)

OTHER PUBLICATIONS

Extended European Search Report dated Aug. 19, 2016 for Application No. 1616171838-1905, 5 pages.

*Primary Examiner* — Hanh Nguyen
(74) *Attorney, Agent, or Firm* — Armstrong Teasdale LLP

(57) ABSTRACT

A housing for an electrical machine includes an endshield and a cover. The electrical machine has a rotation axis, a rotor assembly including a rotor, and a controller assembly. The rotor assembly includes a bearing assembly. The endshield includes an annular center section including a bore sized to couple to the bearing assembly. The cover is coupled to the endshield. The cover includes a generally axially-extending flange wall formed about a perimeter of the cover, a volute-shaped inner chamber configured to at least partially enclose the rotor coupled to the rotor assembly of the electrical machine, and a cooling channel positioned radially outward from the inner chamber. The cooling channel is configured to at least partially enclose the controller assembly of the electrical machine.

19 Claims, 11 Drawing Sheets

(56) References Cited

U.S. PATENT DOCUMENTS

| | | |
|---|---|---|
| 2007/0132323 A1 | 6/2007 | Park |
| 2008/0193275 A1 | 8/2008 | De Filippis et al. |
| 2009/0301485 A1* | 12/2009 | Kenyon ............ A61M 16/0057 128/204.18 |
| 2011/0229358 A1 | 9/2011 | Streng et al. |
| 2011/0240026 A1* | 10/2011 | Ausen ................ A62B 18/045 128/205.12 |
| 2012/0074802 A1 | 3/2012 | Oi et al. |
| 2013/0315752 A1* | 11/2013 | Blaser ................ F04D 15/0218 417/45 |
| 2013/0320786 A1* | 12/2013 | Isoda ....................... H02K 9/06 310/59 |
| 2014/0265663 A1 | 9/2014 | Chamberlin et al. |
| 2015/0004018 A1 | 1/2015 | Le |
| 2015/0303772 A1* | 10/2015 | Le Goff ............... F04D 25/082 415/116 |

* cited by examiner

ELECTRICAL MACHINE HOUSING AND METHODS OF ASSEMBLING THE SAME

BACKGROUND

The embodiments described herein relate generally to electrical machines, and more particularly, to an electrical machine having a volute-shaped housing.

Known residential or commercial forced draft gas-fired systems require air propulsion units. In addition to providing movement of air for forced draft systems, air propulsion units may be used in combination with residential or commercial gas furnaces, humidifiers, water heaters, and hydrogen fuel cells. Such known air propulsion units include motor driven fans and require large, radial motors to operate the fans. These fans include, for example, centrifugal impeller type fans. However, the large radial motors have large space requirements due to their physical size. Using an axial flux motor can reduce the size requirements of the air propulsion unit. However, some know axial flux machines need a large amount of cooling air to cool the electronics of the motor due to the power densities of such known motors.

Such known radial and axial flux motors can require additional space within the forced-draft system to facilitate the cooling systems needed to keep the motors cool. Such cooling systems can be separate or integral to such motors. The cooling systems further add to the air propulsion unit thickness and introduce weight and complexity to the air propulsion unit. Furthermore, the cost is increased in such air propulsion units due to the increased part count required for coupling a cooling assembly to the motor.

In addition, many known air propulsion units include an integrated controller attached to an end of the unit, thereby further increasing the thickness of the air propulsion unit. To reduce the thickness of the air propulsion unit, many known units include complex controller board arrangements and layouts that can add cost and complexity to the unit, and introduce localized heating from the heat generating components that is not adequately dissipated.

BRIEF DESCRIPTION

In one aspect, a housing for an electrical machine is provided. The electrical machine includes a rotation axis, a rotor assembly, and a controller assembly. The rotor assembly includes at least one bearing assembly. The housing includes an endshield including an annular center section having a bore sized to couple to the at least one bearing assembly. The housing also includes a cover coupled to the endshield. The cover includes a generally axially-extending flange wall formed about a perimeter of the cover. The cover also includes a volute-shaped inner chamber configured to at least partially enclose the rotor coupled to the rotor assembly of the electrical machine. In addition, the cover includes a cooling channel positioned radially outward from the inner chamber. The cooling channel is configured to at least partially enclose the controller assembly of the electrical machine.

In another aspect, an electrical machine is provided and includes a rotor assembly including a rotor coupled to a rotor shaft defining a rotation axis. The electrical machine also includes a stator assembly including a stator core and a plurality of windings. Furthermore, the electrical machine includes a housing including an endshield and a cover coupled to the endshield. The cover includes a generally axially-extending flange wall formed about a perimeter of the cover. The cover also includes a volute-shaped inner chamber configured to at least partially enclose the rotor of the rotor assembly. Moreover, the cover includes a cooling channel positioned radially outward from the inner chamber. The cooling channel is configured to at least partially enclose a controller assembly of the electrical machine. The cover also includes a volute-shaped curved wall that extends axially from an inner surface of the cover. The curved wall at least partially defines the inner chamber and the cooling channel. In addition, the electrical machine includes a controller assembly coupled to the housing. The controller assembly is positioned radially outward from the rotor and is located in the cooling channel.

In yet another aspect, a method of assembling an electrical machine is provided. The method includes providing an endshield. Moreover, the method includes coupling a rotor assembly to the endshield to enable rotation of the rotor assembly with respect to the end shield. The rotor assembly includes a rotor having a plurality of blades formed thereon. The method also includes providing a cover that includes a volute-shaped inner chamber configured to at least partially enclose the rotor. The cover also includes a cooling channel positioned radially outward from the inner chamber. Moreover, the cover includes a volute-shaped curved wall that extends axially from an inner surface of the cover. The curved wall at least partially defines the inner chamber and the cooling channel. In addition, the method includes coupling the cover to the endshield to substantially enclose the rotor therein.

Figure 1:
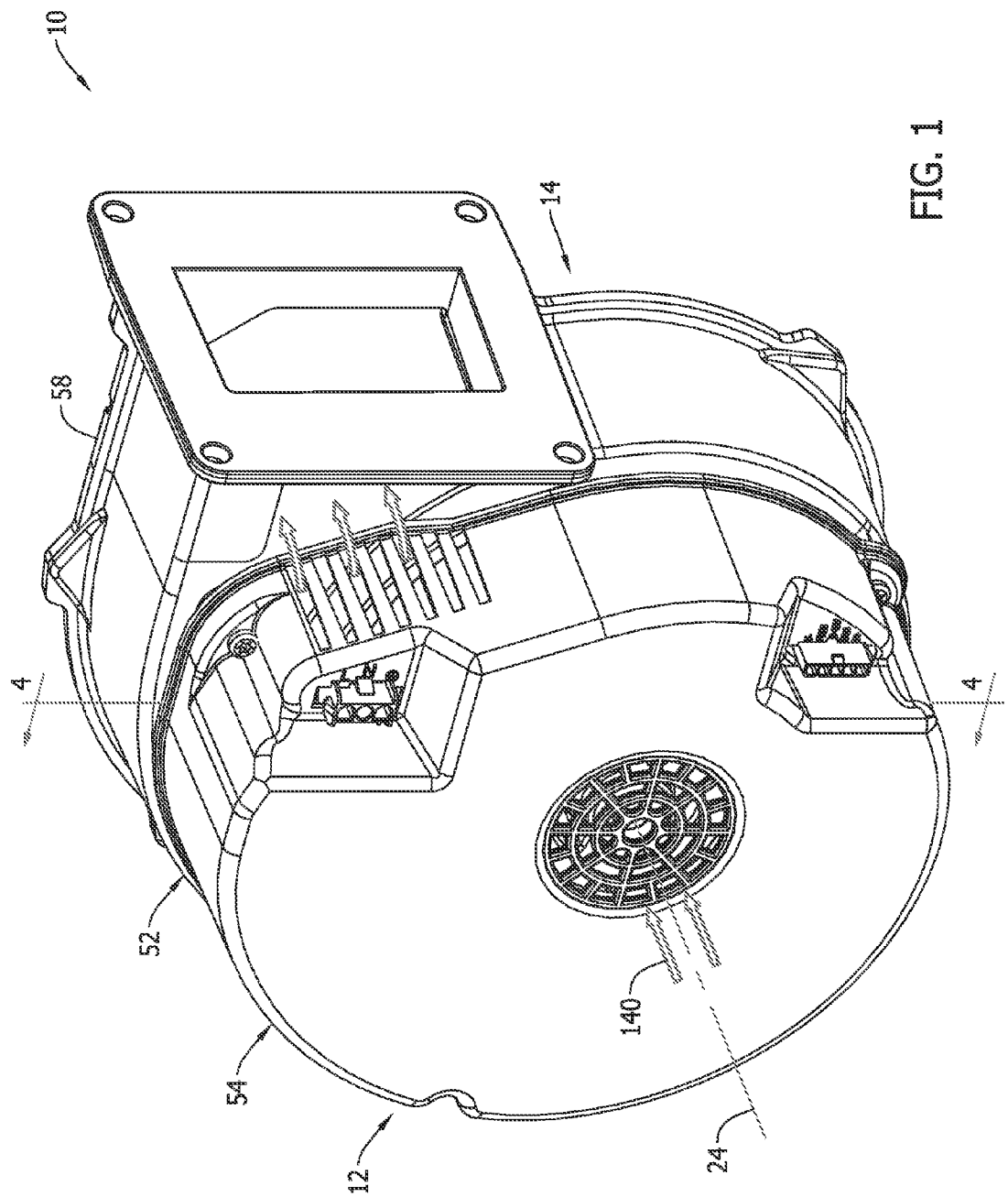
FIG. 1 is a schematic perspective of an exemplary electrical machine.

Although specific features of various embodiments may be shown in some drawings and not in others, this is for convenience only. Any feature of any drawing may be referenced and/or claimed in combination with any feature of any other drawing.

DETAILED DESCRIPTION

Embodiments of the system described herein cool an electrical machine using air that is drawn into a motor housing and accelerated in a volute-shaped chamber using a fan that is integrally formed on the rotor of the rotor assembly of the electrical machine. Thus, the housing is specifically configured to facilitate enhanced cooling of an integrated control assembly. More specifically, the rotor assembly draws cooling air into the housing and accelerates is in a centrifugal direction, such that the velocity and pressure of the cooling airflow is increased. A portion of the airflow is forced through the stator assembly by the increased pressure of the accelerated airflow. This portion is recirculated through the stator assembly and back into the main cooling airflow. The cooling airflow is forced through a cooling channel formed in the housing of the electrical machine such that it passes over the integrated control assembly. The forced airflow facilitates cooling the control assembly by forced convection. The electrical machine includes a substantially planar controller assembly coupled radially outward from the stator assembly. The controller assembly enables a low profile housing to cover the electrical machine and the controller assembly such that the housing extends a minimal distance about the stator and rotor assemblies. As such, the electrical machine takes up less space within a fluid circulating system and provides for additional space for additional system components. Furthermore, the electrical machine contains fewer overall components due to integration of the fan components directly on the rotor, which provides for an electrical machine that is less expensive and easier to assemble than other known electrical machines. Additional features of the system are described in more detail herein.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "axial" and "axially" refer to directions and orientations extending substantially parallel to a rotation axis of the electrical machine. The terms "radial" and "radially" refer to directions and orientations extending substantially perpendicular to the rotation axis of the electrical machine. In addition, as used herein, the terms "circumferential" and "circumferentially" refer to directions and orientations extending arcuately about the rotation axis of the electrical machine.

Figure 2:
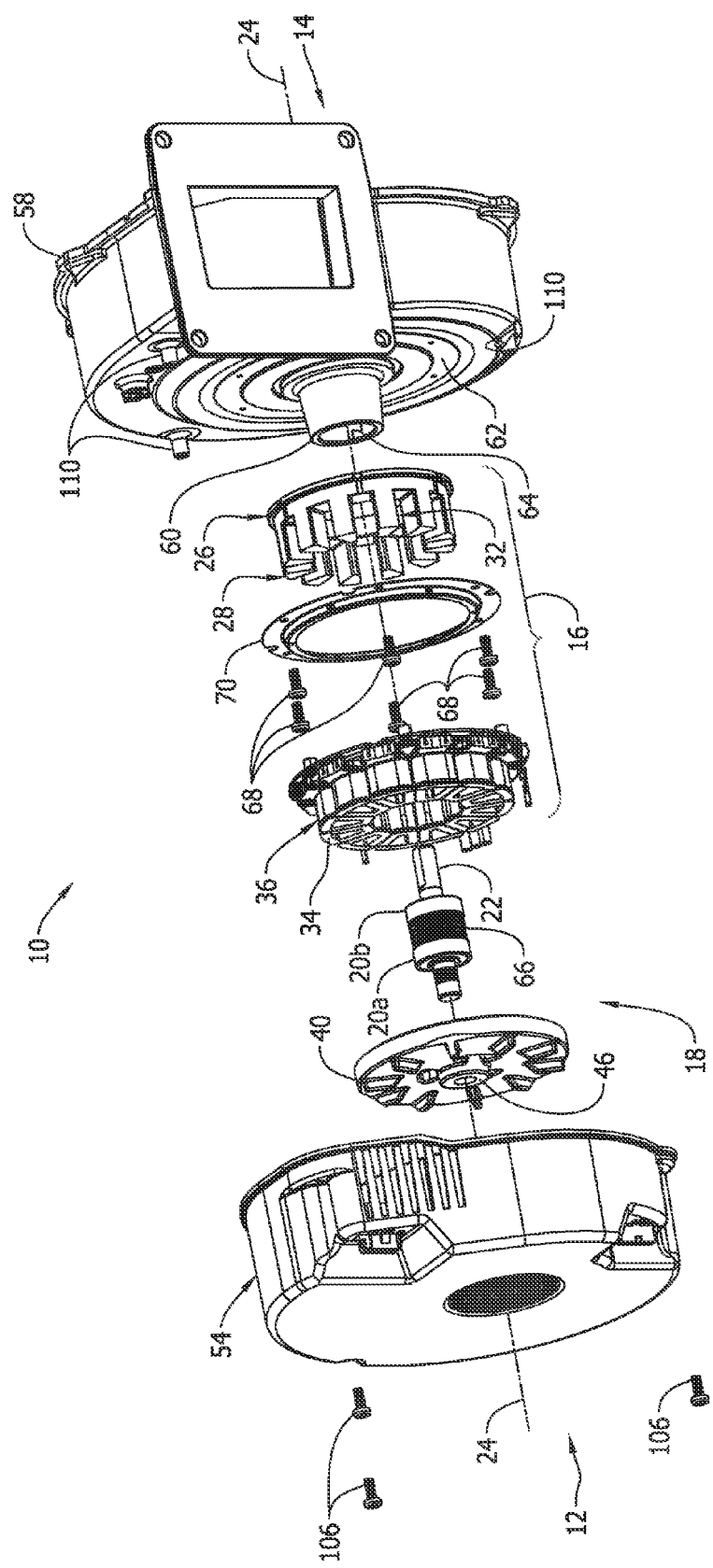
FIG. 2 is an exploded perspective view of the electrical machine shown in FIG. 1.
Figure 3:
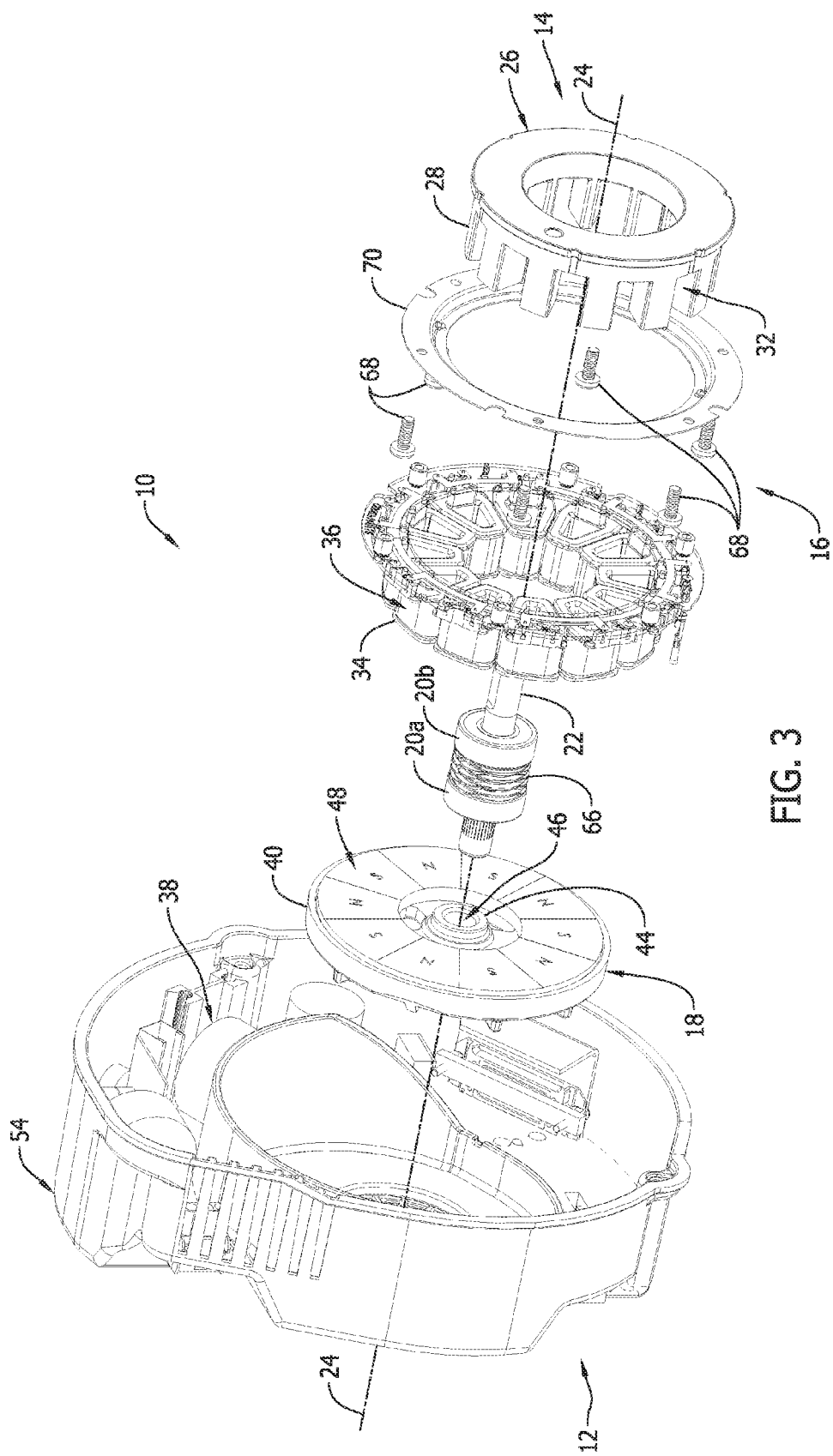
FIG. 3 is an exploded perspective view of the electrical machine shown in FIG. 1 without an endshield.
Figure 4:
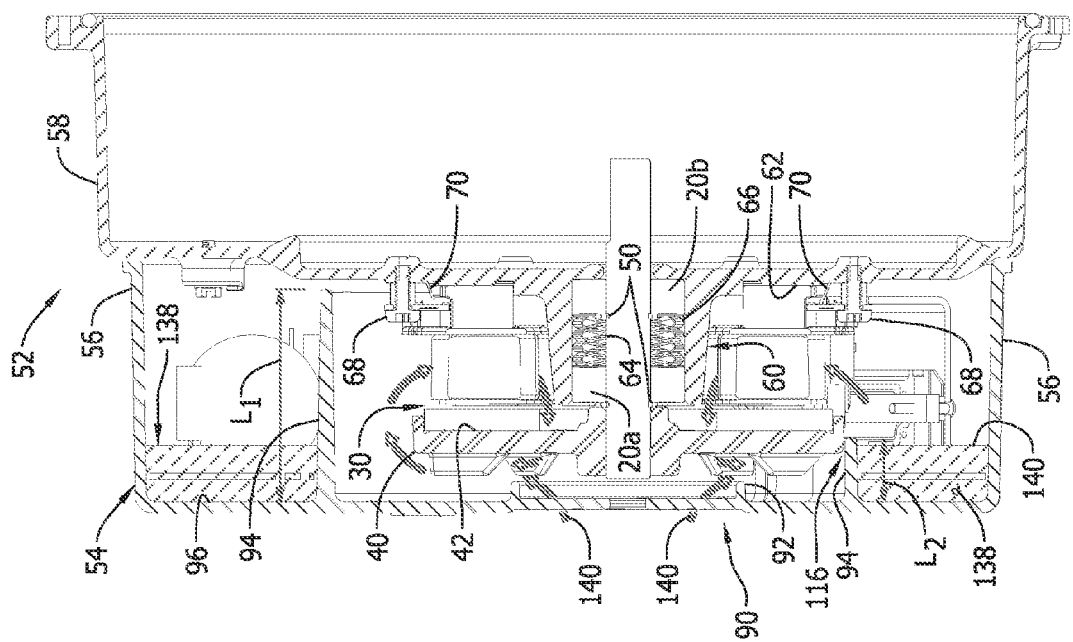
FIG. 4 is a cross-sectional view of the electrical machine taken along line 4-4 of FIG. 1.

FIG. 1 is a schematic perspective of an exemplary electrical machine 10. FIG. 2 is an exploded perspective view of electrical machine 10 looking from a first end 12 toward a second end 14 of electrical machine 10, and FIG. 3 is an exploded perspective view of electrical machine 10 shown without an endshield 58, looking from second end 14 toward first end 12. FIG. 4 is a cross-sectional view of electrical machine 10 taken along line 4-4 of FIG. 1. In the exemplary embodiment, electrical machine 10 is configured to generate a fluid flow in a forced draft system, for example, without limitation, a residential or commercial gas furnace, a humidifier, a water heater, a hydrogen fuel cell, or any gas-fired system. Alternatively, electrical machine 10 is coupled to a system other than a fluid circulating system and is configured to function as either an electric motor or an electric generator. In the exemplary embodiment, electrical machine 10 is an electric motor, and more specifically, an axial flux electric motor in which the flux in an air gap extends in a direction parallel to the axis of rotation of electrical machine 10. Alternatively, electrical machine 10 is a radial flux motor, where the flux extends radially from the axis of rotation of electrical machine 10.

In the exemplary embodiment, electrical machine 10 includes a stator assembly 16 and a rotor assembly 18. The rotor assembly includes a pair of bearing assemblies 20a, 20b coupled to a rotor shaft 22. Stator assembly 16, rotor assembly 18, and bearing assemblies 20a, 20b are positioned concentrically about rotor shaft 22, each oriented concentrically with a rotation axis 24 of electrical machine 10. Stator assembly 16 includes a stator core 26 that includes a plurality of circumferentially-spaced stator teeth 28 that extend axially, i.e., substantially parallel to rotation axis 24. In the exemplary embodiment, stator core 26 is a solid core stator. A solid core can be a complete, one-piece component, or can include multiple non-laminated sections coupled together to form a complete solid core. Alternatively, stator core 26 is a laminated core. As defined herein, the laminated core is radially laminated, e.g., fabricated with a ribbon of material wound into a core, or a series of concentric rings stacked one inside the other to create a core of material, for example, soft iron or silicon steel. In the exemplary embodiment, stator core 26 is fabricated from a magnetic material, such as, for example, a Soft Magnetic Alloy (SMA) or a Soft Magnetic Composite (SMC) material. Alternatively, stator core 26 is fabricated from any ferromagnetic material that enables electrical machine 10 to function as described herein, such as, for example, steel or a steel alloy. The use of SMA or SMC materials in a solid core enable 3-dimensional flux paths and facilitate reducing high frequency losses (e.g., losses at frequencies above 60 Hz) when compared with laminated stator cores. The use of SMC or SMA materials also facilitates increasing control of an air gap 30 (shown in FIG. 4), which facilitates improving performance and minimizing noise.

Between each pair of adjacent stator teeth 28 is a slot 32. Each stator tooth 28 is configured to receive one of a plurality of insulating bobbins 34 that includes a copper winding 36 would around an outer surface of each respective bobbin 34. Alternatively, each stator tooth 28 includes copper winding 36 without bobbin 34. Electrical machine 10 can include one copper winding 36 per stator tooth 28 or one copper winding 36 positioned on every other stator tooth 28. Copper windings 36 are electrically coupled to a controller assembly 38 for receiving electrical current thereby inducing an electromagnetic field about a pole of stator core 26. Controller assembly 38 is configured to apply a voltage to one or more of copper windings 36 at a time for commutating copper windings 36 in a preselected sequence to rotate rotor assembly 18 about rotation axis 24. In the exemplary embodiment, electrical current is a three-phase alternating current (AC). Alternatively, the current is any type of electrical current that enables electrical machine 10 to function as described herein. In the exemplary embodiment, controller assembly 38 functions to both accelerate and decelerate rotor assembly 18.

In the exemplary embodiment, rotor assembly 18 includes a rotor 40 having an axially inner surface 42 and a radially inner wall 44 that at least partially defines an opening 46. In an alternative embodiment, rotor 40 functions as a fan. In the exemplary embodiment, rotor 40 is a component of rotor assembly 18 and includes a plurality of permanent magnets 48 coupled to inner surface 42 of rotor 40. In one suitable embodiment, magnets 48 are coupled to rotor 40 using an adhesive. Alternatively, magnets 48 are coupled to rotor 40 by a magnet retaining ring or any other retention method that enables electrical machine 10 to function as described herein. In the exemplary embodiment, permanent magnets 48 are symmetrical, which facilitates manufacturing by enabling a single magnet design for use with each magnet 48. Furthermore, each magnet 48 has a substantially flat profile which facilitates reducing waste during manufacturing, and therefore, facilitates reducing manufacturing cost. In the exemplary embodiment, permanent magnets 48 are neodymium magnets. Alternatively, any suitable permanent magnet material may be included that enables electrical machine 10 to function as described herein, for example, without limitation, Samarium Cobalt and Ferrite. Rotor assembly 18 is rotatable within electrical machine 10, and more specifically, rotatable about bearing assemblies 20a, 20b about rotation axis 24.

In the exemplary embodiment, as described above, stator core 26 is fabricated from a material that enables magnetic attraction between permanent magnets 48 and stator core 26 to facilitate retaining rotor assembly 18, rotor shaft 22, and bearing assemblies 20a, 20b in place within electrical machine 10. Clips 50 are coupled to rotor shaft 22 and are configured to facilitate holding bearing assemblies 20a, 20b in place along a length of rotor shaft 22.

In operation, copper windings 36 are coupled to stator core 26 and are energized in a predetermined sequence by controller assembly 38. Cooper winding's 44 facilitates generating an axial magnetic field that moves in one of a clockwise and counterclockwise direction around stator core 26, depending on the predetermined sequence in which copper windings 36 are energized. The moving magnetic field intersects with a flux field generated by permanent magnets 48 to generate a torque that causes rotor assembly 18 to rotate about rotation axis 24 relative to stator assembly 16. The generated torque is a direct function of the strength, or intensity, of the magnetic field interactions between cooper windings 36 and permanent magnets 48. Because rotor 40 is coupled directly to rotor shaft 22, rotation of rotor 40 facilitates rotation of various component coupled to rotor shaft 22, such as a centrifugal fan (not shown).

In the exemplary embodiment, electrical machine 10 includes housing 52 configured to provide a protective covering for electrical machine 10 and controller assembly 38. Housing 52 includes a cover 54 having an integrated flange wall 56 formed about from a perimeter of cover 54 and extending axially towards second end 14 of axial machine 10. Furthermore, housing 52 includes an endshield 58 that is configured to couple to cover 54, thereby enclosing components of electrical machine 10 within housing 52. Housing 52 is configured to channel a cooling airflow 140 over stator assembly 16 and controller assembly 38 during operation of electrical machine 10.

With reference to FIGS. 1, 2, and 4, in the exemplary embodiment, housing 52 includes endshield 58 that includes a generally volute-shape, i.e., a spiral or scroll-shaped form, with respect to rotation axis 24, and is fabricated as a portion of a blower housing. Alternatively, endshield 58 can have any shape and configuration that enable endshield 58 to function as described herein. In the exemplary embodiment, endshield 58 includes an annular center section 60. Annular center section 60 includes a generally tube-shaped structure extending axially away from a stator mounting surface 62 that facilitates retaining bearing assemblies 20a, 20b (best shown in FIG. 4) in place. Annular center section 60 includes a bore 64 sized to form an interference fit with bearing assemblies 20a, 20b. As used herein, the phrase "interference fit" means a value of tightness between bore 64 and outside diameters of bearing assemblies 20a, 20b, i.e., an amount of radial clearance between the components. A negative amount of clearance is also commonly referred to as a press fit, where the magnitude of interference determines whether the fit is a light interference fit or an interference fit. A small amount of positive clearance is referred to as a loose or sliding fit.

In one embodiment, bore 64 is sized to couple to bearing 20b with an interference fit, i.e., bore 64 sized slightly smaller than an outer diameter (not shown) of bearing 20b. In such an embodiment, bore 64 forms a sliding fit with an outer diameter of bearing 20a. Such an embodiment enables a spring 66 to bias bearing assembly 20a axially away from bearing 20b along rotor shaft 22 to facilitate placing a preload on bearing assemblies 20a, 20b. Alternatively, bore 64 and bearing assemblies 20a, 20b have any sizes that enable electrical machine 10 to function as described herein. In the exemplary embodiment, stator assembly 16, and in particular stator core 26, is coupled to endshield 58 using a plurality of mechanical fasteners 68 and a retaining ring 70.

Figure 5:
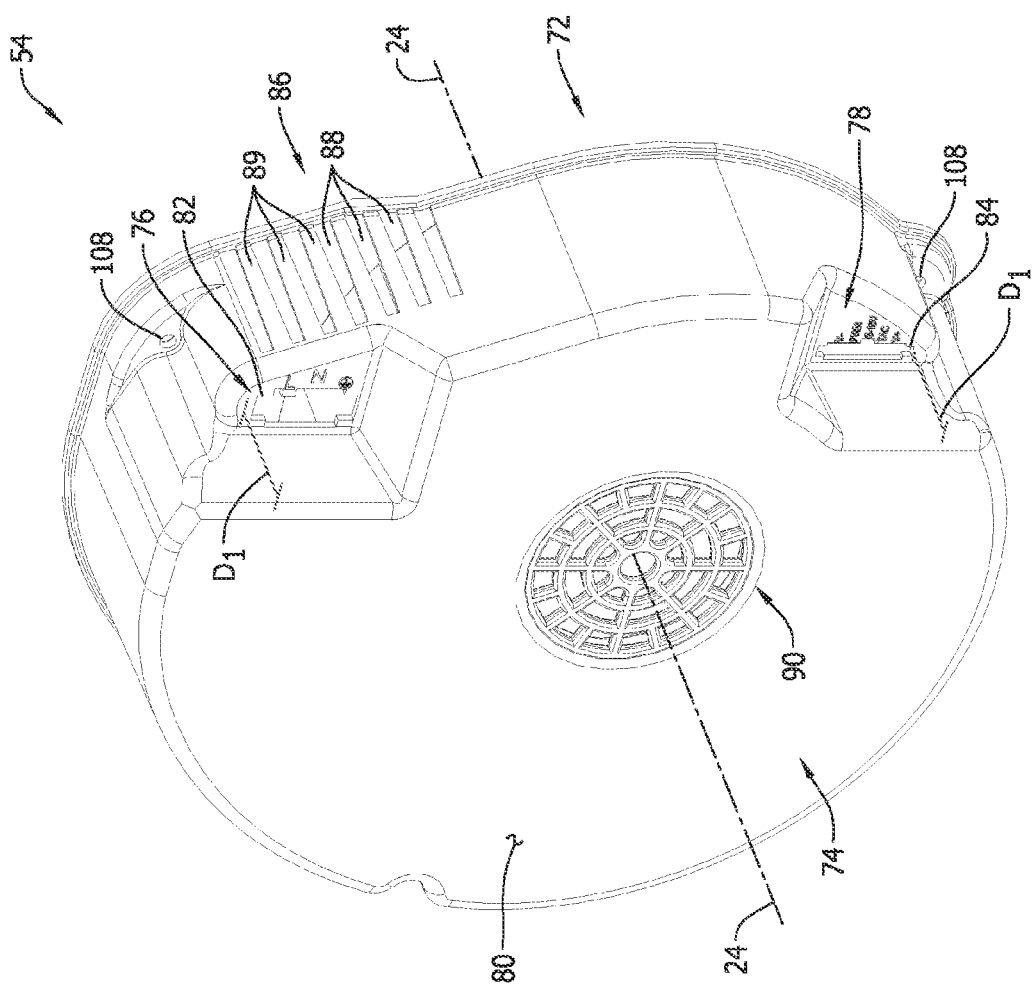
FIG. 5 is a schematic perspective view of a first side of a cover of the electrical machine shown in FIG. 1.
Figure 6:
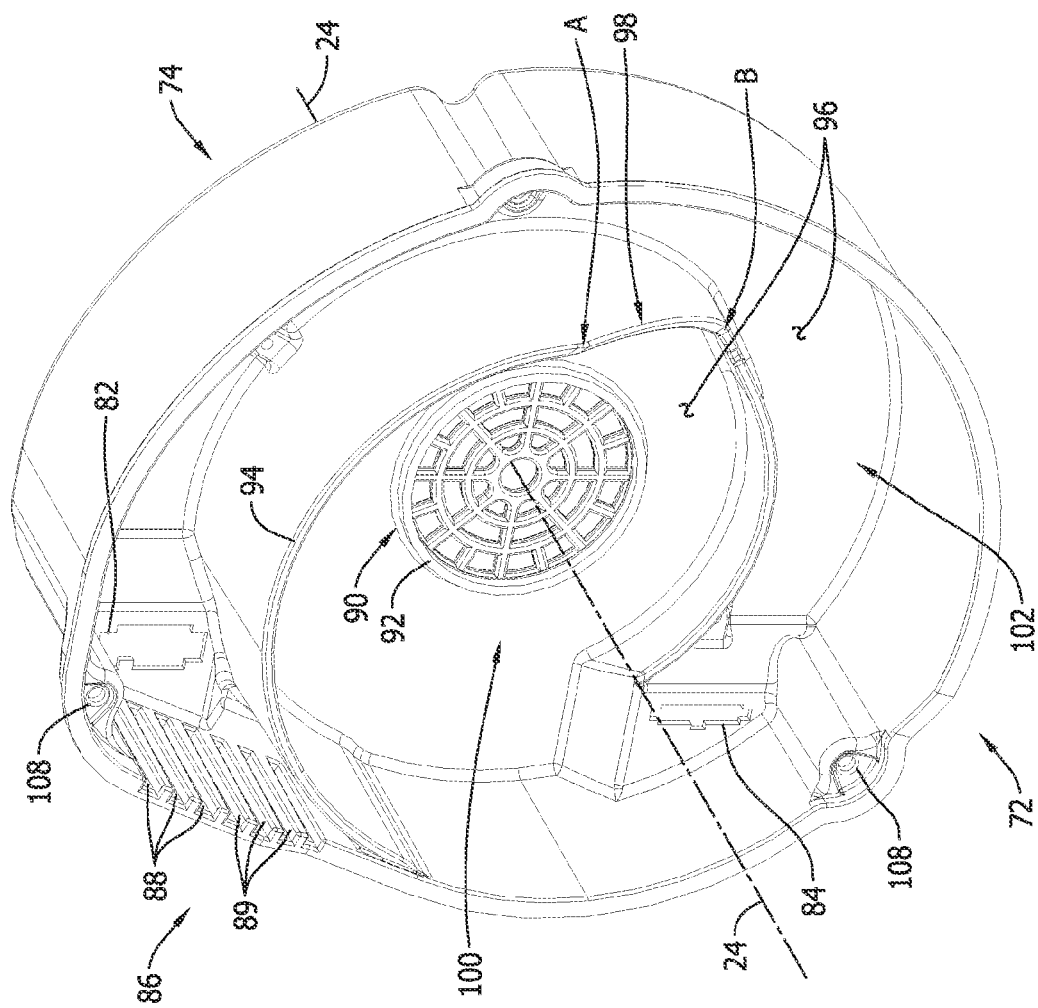
FIG. 6 is a schematic perspective view of a second side of the cover shown in FIG. 5.
Figure 7:
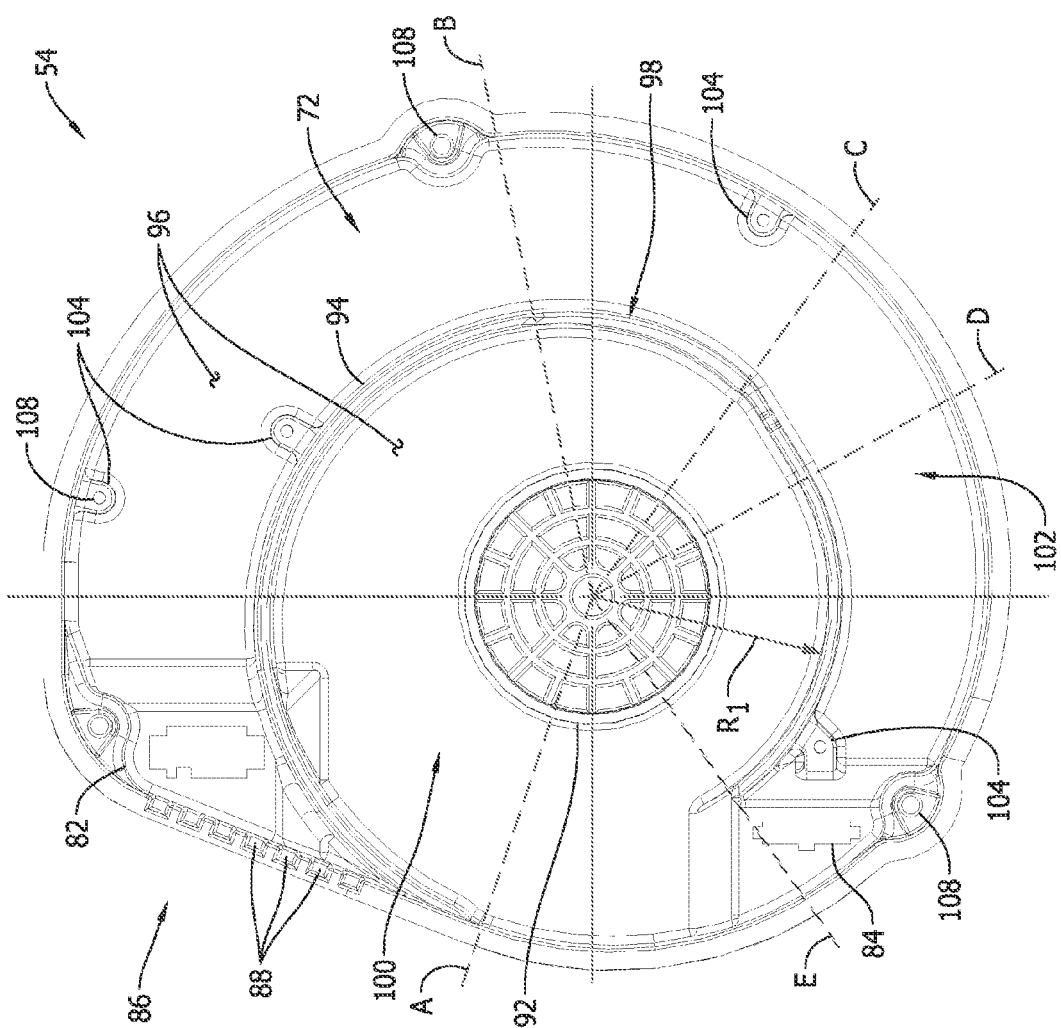
FIG. 7 is an end view of the second side of the cover shown in FIG. 5.

Cover 54 is shown in more detail in FIGS. 5-7. Cover 54 is configured with two distinct sides; a component engaging side 72 as best shown in FIGS. 6 and 7, and a cover side 74 as best shown in FIG. 5. Specifically, FIG. 5 is a schematic perspective of cover 54 looking from cover side 74 toward component engaging side 72. FIG. 6 is a schematic perspective of cover 54 looking from component engaging side 72 toward cover side 74. FIG. 7 is an end view of cover 54 looking at component engaging side 72.

In the exemplary embodiment, cover 54 is generally volute-shaped, having an outer perimeter that conforms generally to the outer perimeter of endshield 58. Cover 54 includes a first recess 76 and a second recess 78 offset axially a predetermined distance $D_1$ from an outer surface 80 of cover 54. First recess 76 include a first opening 82 and second recess 78 includes a second opening 84, where each opening 82, 84 is configured to receive an electrical connector of controller assembly 38. First recess 76 is positioned adjacent an air outlet portion 86 of cover 54. Air outlet portion 86 includes a plurality of longitudinal through-openings 88 to enable cooling airflow 140 to exit from within cover 54. In the exemplary embodiment, longitudinal through-openings 88 are formed as generally rectangular-shaped vertically extending slots formed in flange wall 56 to define a plurality of slats, or baffles 89 in general directional alignment with a path of cooling airflow 140. As used herein, the term "directional alignment" is intended to mean the general flow direction of airflow 140 at outlet portion 86, i.e., such as a generally straight path through outlet portion 86, such that airflow 140 is not intentionally turned by baffles 89. Alternatively, longitudinal through-openings 88 are formed in any desired shape that enables cover 54 to function as described herein.

In the exemplary embodiment, cover 54 includes an annular intake opening 90 formed generally concentric with rotation axis 24. Intake opening 90 includes a latticework extending across the opening to form an open framework of material configured to enable air to pass through while facilitating preventing physical contact rotor assembly 18 (shown in FIG. 2) by outside objects, such as a user's hand. Intake opening 90 includes an axially extending rim 92 that extends inward, i.e., away from cover side 74 toward component engaging side 72 of cover 54. Rim 92 extends inward a predetermined distance, without contacting rotor assembly 18, to facilitate guiding cooling airflow 140 toward rotor assembly 18.

With reference to component engaging side 72, as shown in FIGS. 6 and 7, a curved wall 94 extends axially inward from an inner surface 96 of cover 54. Curved wall 94 is a volute-shaped wall with respect to rotation axis 24 forming an increasing expansion angle for airflow 140. Curved wall 94 extends generally circumferentially from an intersection with flange wall 56 proximate air outlet portion 86 a predetermined arc length. In the exemplary embodiment, curved wall 94 intersects with flange wall 56 at a location A, shown in FIG. 7 by a radial line extended from rotation axis 24. Curved wall 94 extends generally in a volute-shaped arc about rotation axis 24 to a location D, shown in FIG. 7 by a radial line extended from rotation axis 24. Alternatively, curved wall 94 can extend in any arc length about rotation axis 24 that enables electrical machine 10 to function as described herein.

In the exemplary embodiment, curved wall 94 is a varying height wall, extending axially a first length $L_1$ from inner surface 96 between location A and a location B, shown in FIG. 7 by a radial line extended from rotation axis 24. Furthermore, curved wall 94 includes an axial transition portion 98 extending from first length $L_1$ to a second length $L_2$. Transition portion 98 extends generally circumferentially between location B and a location C, also shown in FIG. 7 by a radial line extended from rotation axis 24. Curved wall 94 extends between locations C, D, and E at second length $L_2$.

In the exemplary embodiment, curved wall 94 generally defines an inner chamber portion 100 configured to at least partially enclose stator assembly 16 and rotor assembly 18, and a cooling channel 102 configured to at least partially enclose controller assembly 38. Cooling channel 102 is defined generally as an area between curved wall 94 and flange wall 56. Cooling channel 102 includes a plurality of mounting bosses 104 configured to accept a mechanical fastener (not shown in FIGS. 5-7) to hold a circuit board (not shown in FIGS. 5-7) of controller assembly 38. Curved wall 94 facilitates substantially isolating stator assembly 16 and rotor assembly 18 from controller assembly 38 within cover 54. This facilitates reducing electrical interference or short circuiting between the assemblies and also facilitates active cooling of controller assembly 38.

In the exemplary embodiment, cover 54 is formed from a sheet material blank, for example, aluminum or steel sheet, using a drawing process. In another embodiment, cover 54 is cast component. Accordingly, the features of cover 54 described herein may have a draft angle associated with each wall and/or pocket to promote removal of cover 54 from a mold. In such an embodiment, cover 54 is fabricated by casting a casting material, for example, without limitation, aluminum, in the shape of cover 54. Alternatively, cover 54 is fabricated from any material that enables cover 54 to function as described herein, for example, without limitation, an aluminum-tin-nickel alloy, iron, or steel. In some alternative embodiments, cover 54 is injection molded and is fabricated from a thermoplastic resin, for example, without limitation, polybutylene terephthalate (PBT). Alternatively, cover 54 is fabricated by methods other than drawing or casting/molding, e.g., machining, and therefore, does not have a draft angle associated with the features as described herein. Further, in the exemplary embodiment, cover 54 is a single piece component. Alternatively, cover 54 is fabricated as several separate components that can be coupled together to form cover 54.

In the exemplary embodiment, housing 52 is assembled to substantially enclose stator assembly 16 and rotor assembly 18 therein. Cover 54 is coupled to endshield 58 using a plurality of mechanical fasteners 106 (shown in FIG. 2). Each fastener 106 extends through and opening 108 formed in cover 54. Each opening 108 corresponds to a threaded boss 110 formed on endshield 58 (shown in FIG. 2).

Figure 8:
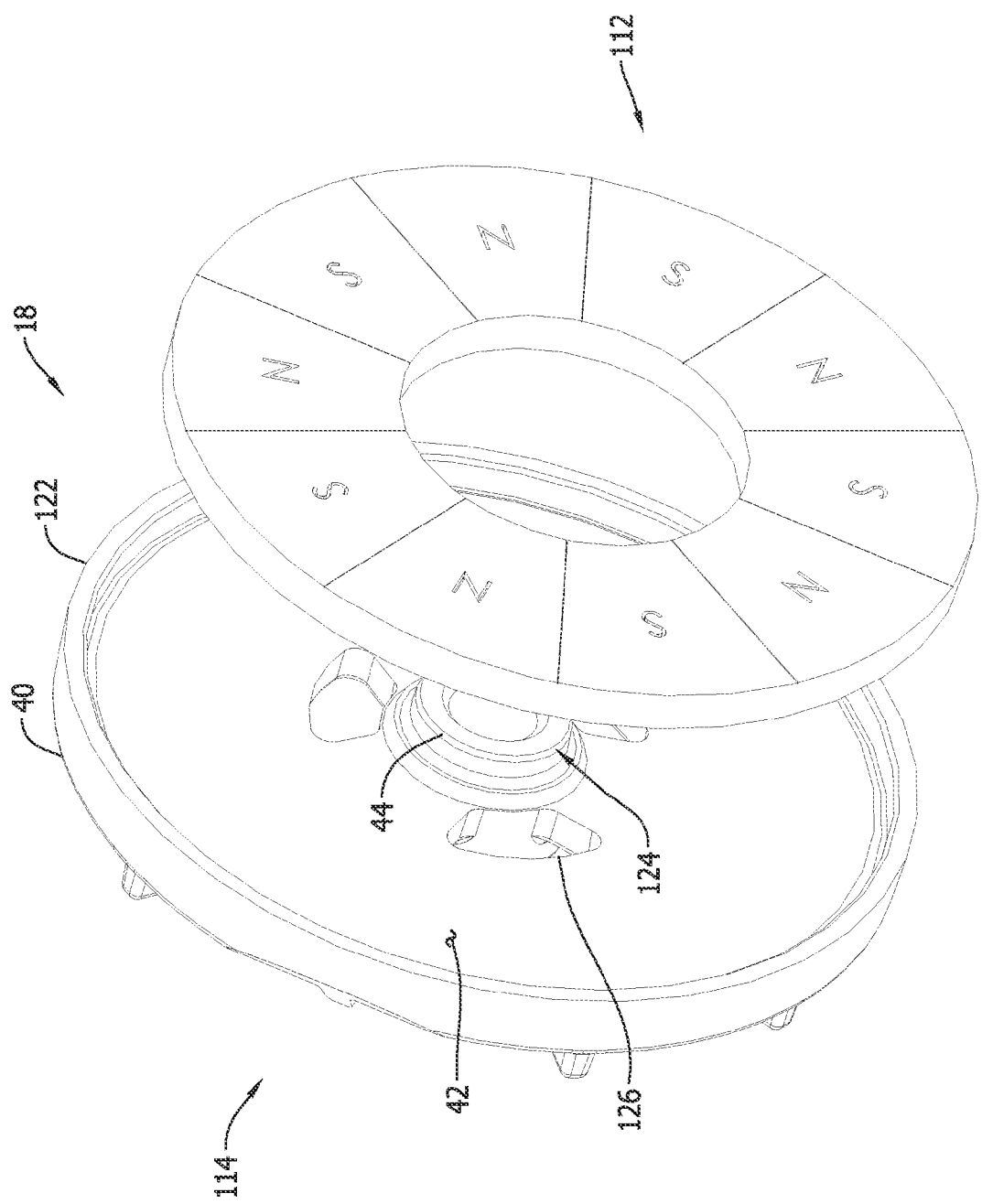
FIG. 8 is an exploded perspective view of a rotor assembly of the electrical machine shown in FIG. 3, illustrating a second side of a rotor and permanent magnets.
Figure 9:
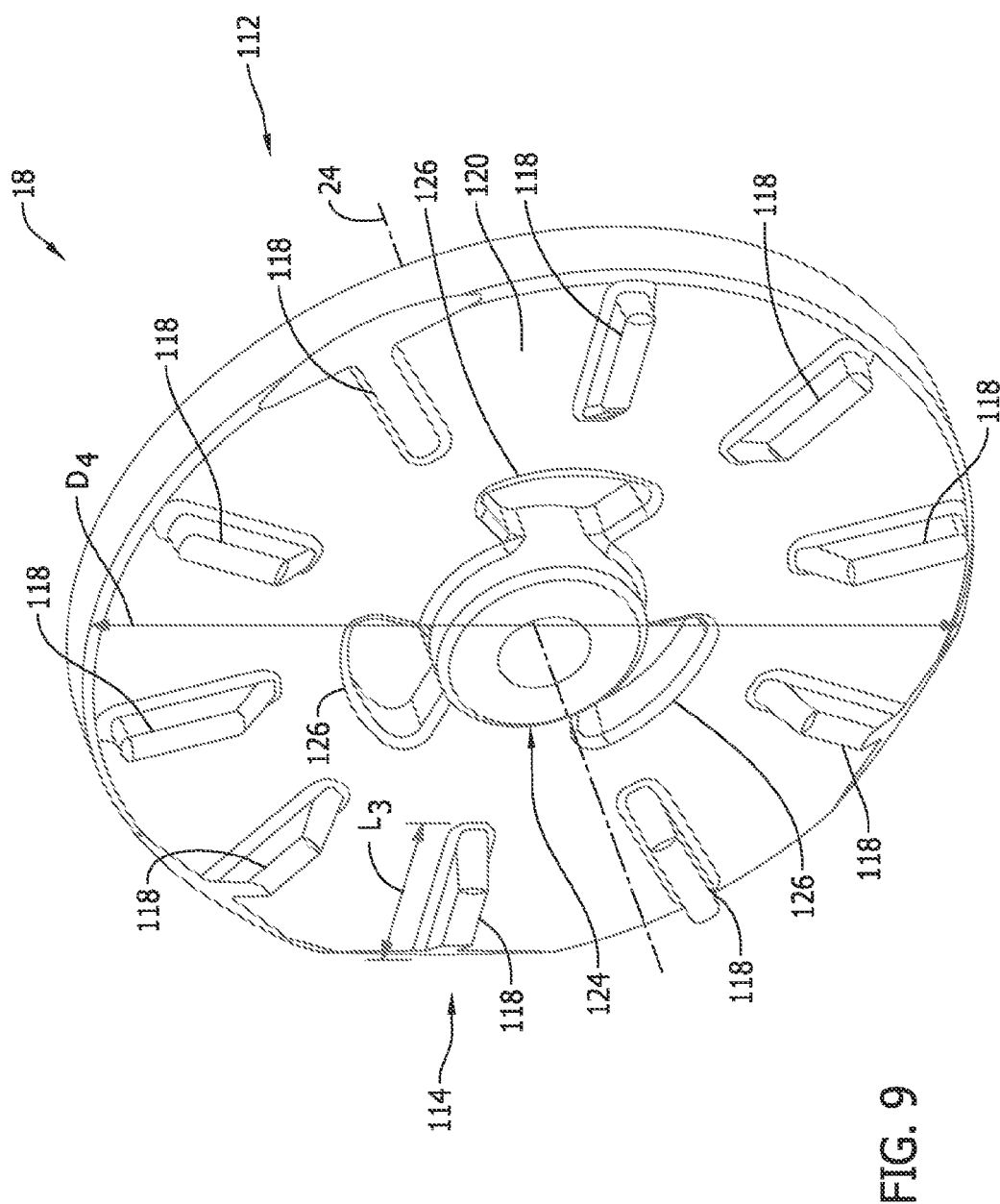
FIG. 9 is a schematic perspective view of a first side of the rotor of the rotor assembly shown in FIG. 8.

FIG. 8 is an exploded perspective of rotor assembly 18 of electrical machine 10 shown in FIG. 3, looking from a second side 112 toward a first side 114 of rotor assembly 18. FIG. 9 is a schematic perspective of rotor 40, looking from first side 114 toward second side 112.

In the exemplary embodiment, rotor 40 is disk-shaped and has an outer diameter $D_4$ that is slightly smaller than a radius $R_1$ of curved wall 94 at its smallest arc radius, i.e., between location D and location E, as shown in FIG. 7. As shown in FIG. 4, diameter $D_4$ is sized to leave a small radial gap 116 between rotor 40 and curved wall 94. Rotor 40 includes a plurality of blades 118 extending axially outward from an outer surface 120 of rotor 40. Each blade 118 extends generally radially with respect to rotation axis 24. Blades 118 extend radially from an outer edge of rotor 40 radially inward a predetermined length $L_3$, which substantially corresponds to a diameter of rim 92 of intake opening 90. As described above with respect to rim 92, each blade 118 extends outward a predetermined distance, without contacting cover 54, or more particularly, rim 92. In the exemplary embodiment, rotor 40 includes ten blades 118. Alternatively, rotor 40 includes any number of blades 188 that enables rotor 40 to function as described herein.

In the exemplary embodiment, blades 118 are straight blades that extend substantially radially outward along radial lines from rotation axis 24 of rotor 40. Furthermore, blades 118 are substantially equi-spaced about rotor 40. Alternatively, blades 118 can include one of a backward inclined blade, a backward curved blade, a forward inclined blade, a forward curved blade, and an airfoil-shaped blade. Alternatively, fan impeller 10 may have any suitable blade shape or combination of blade shapes that enable rotor 40 to function as described herein.

In the exemplary embodiment, rotor 40 includes an axially extending lip 122 that extends away from first side 114 of rotor 40 toward second side 112. Lip 122 is configured to facilitate locating permanent magnets 48 substantially concentric with rotation axis 24 of electrical machine 10 to facilitate reducing imbalances and vibrations. Alternatively, rotor 40 does not include lip 122 and permanent magnets 48, and functions as a fan. In the exemplary embodiment, rotor 40 includes substantially flat and smooth inner surface 42, which, as described herein, is configured to mate directly to permanent magnets 48. As described herein, permanent magnets 48 are coupled to rotor 40 using an adhesive. Alternatively, permanent magnets 48 are coupled to rotor 40 by a magnet retaining ring or any other retention method that enables electrical machine 10 to function as described herein.

In the exemplary embodiment, radially inner wall 44 forms a hub portion 124 that includes opening 46 therethrough. Opening 46 is sized to couple to rotor shaft 22 via an interference fit, i.e., opening 46 is sized slightly smaller than a diameter (not shown) of rotor shaft 22. Hub portion 124 extends axially away from outer surface 120 and inner surface 42 of rotor 40. The additional material provided by the extended length of hub portion 124 facilitates providing strength to rotor 40 for a proper interference fit with rotor shaft 22.

Moreover, rotor 40 includes a plurality of axially extending openings or holes 126 formed through rotor 40. Holes 126 are located adjacent hub portion 124 and generally have a radially outer edge that generally corresponds to an inner edge of bobbins 34 of stator assembly 16 to enable cooling airflow 140 to flow through the central area of stator assembly 16 and rotor assembly 18. In the exemplary embodiment, there are three generally kidney-shaped openings. Alternatively, there are any number of openings having any shape that enables electrical machine 10 to function as described herein. In the exemplary embodiment, rotor 40 is fabricated from a solid metal material, for example, without limitation, steel or iron. Alternatively, rotor 40 is fabricated from, for example, without limitation, a plastic material, an SMA material, an SMC material, or a powdered ferrite material using a sintering process.

With reference to FIGS. 1-4, in the exemplary embodiment, stator assembly 16 is coupled to endshield 58 via plurality of fasteners 68 extending through retaining ring 70 and stator mounting surface 62 of endshield 58. Furthermore, each one of bearings 20a, 20b is coupled to bearing locator 68 of endshield 58. Rotor assembly 18 is positioned within housing 52 such that rotor shaft 22 extends through bearing assemblies 20a, 20b. The locations of bearings 20a, 20b in endshield 58 and clips 50 on rotor shaft 22 are configured to control the width of air gap 30, which facilitates improving performance and minimizing noise. Cover 54 is coupled to endshield 58 to complete assembly of housing 52 and to enclose electrical machine 10.

Figure 10:
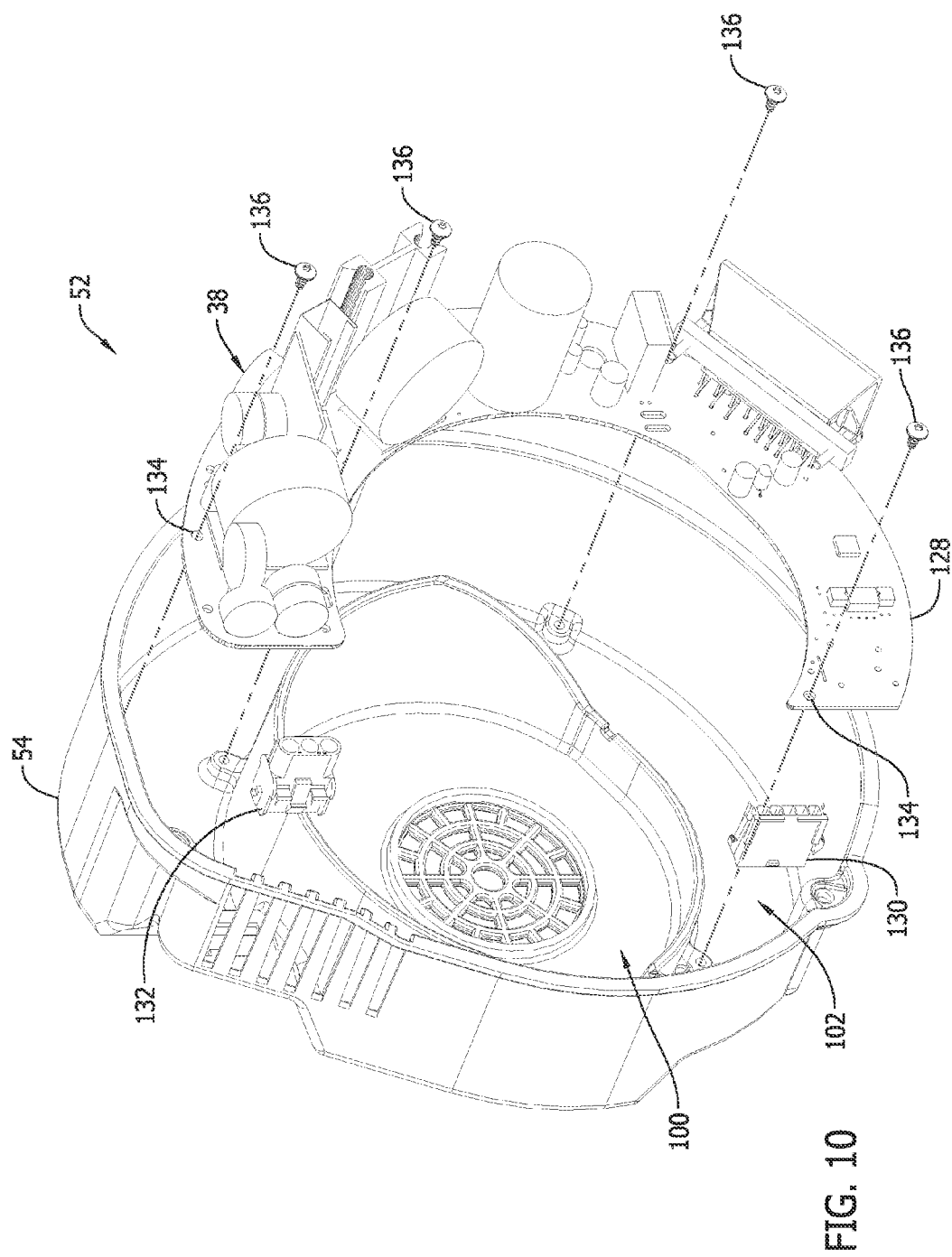
FIG. 10 is an exploded perspective view of a partial motor housing assembly of the electrical machine shown in FIG. 1, illustrating the cover and a controller assembly.
Figure 11:
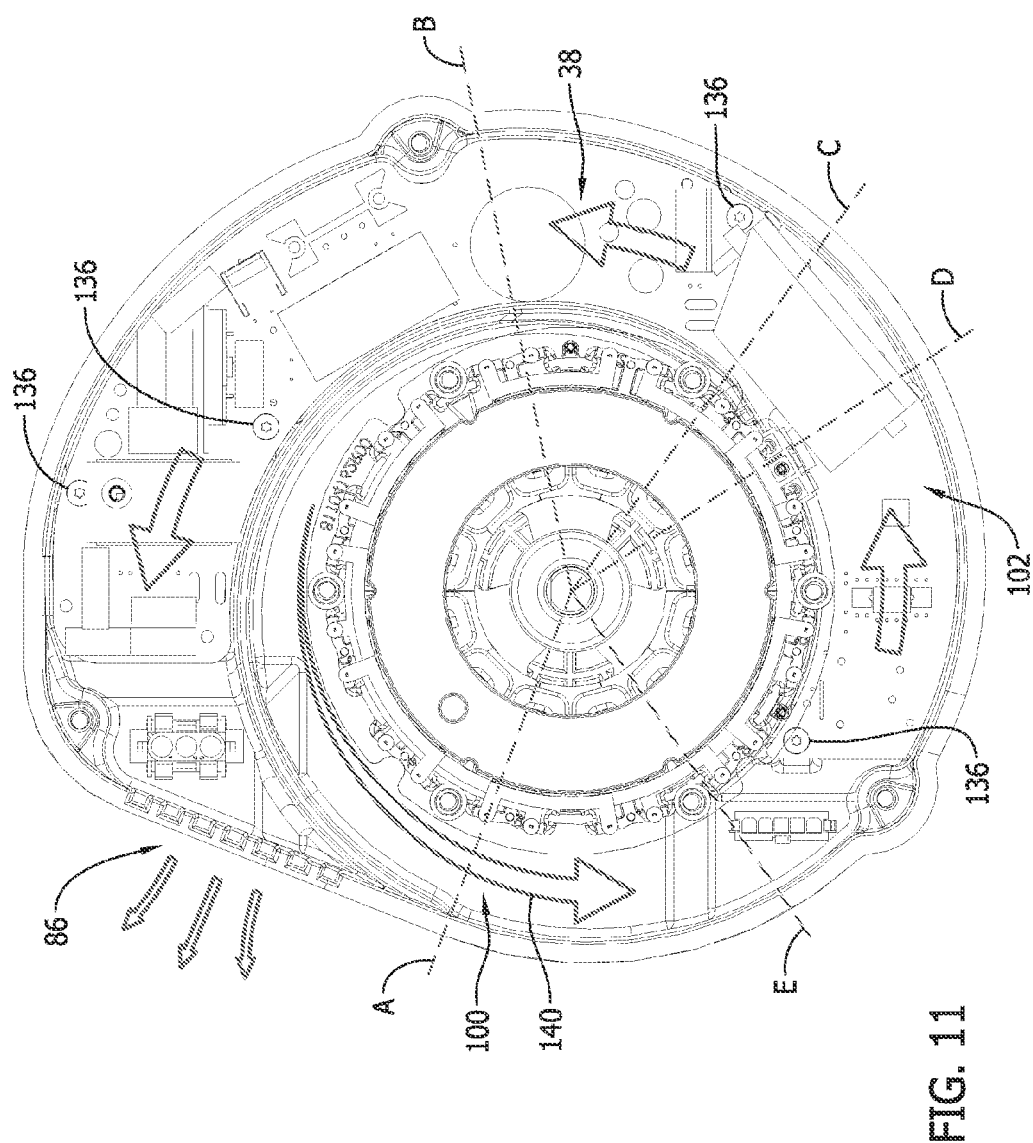
FIG. 11 is an end view of the second side of the electrical machine shown in FIG. 1 without the endshield.

FIG. 10 is an exploded perspective of partial housing assembly 52 of electrical machine 10 shown in FIG. 1, showing cover 54 and controller assembly 38. FIG. 11 is an end view of electrical machine 10 shown in FIG. 1 without endshield 58, looking from second end 14 toward first end 12 of electrical machine 10. In the exemplary embodiment, controller assembly 38 is coupled within cover 54 adjacent to stator assembly 16 and rotor assembly 18, such that controller assembly 38 is positioned radially outward from stator assembly 16. In particular, controller assembly 38 is coupled in cooling channel 102, which defined generally as the area between curved wall 94 and flange wall 56. Controller assembly 38 includes at least one circuit board 128. In the exemplary embodiment, circuit board 128 is a single circuit board and includes at least, for example, without limitation, a user interface portion coupled to a user input connector 130, and an AC input portion coupled to power connector 132. Alternatively, controller assembly 38 includes more than one circuit board such that various functions of controller assembly 38 are contained on separate boards. For example, without limitation, in one embodiment, controller assembly 38 includes a user interface board, a rectifier board, an inverter board, and an AC input board. In another suitable embodiment, controller assembly 38 includes two circuit boards such that power can be supplied directly to an inverter board, thereby eliminating the need for a rectifier board and a user interface board.

Advantages of breaking controller assembly 38 into modular board components, includes: enabling controller assembly 38 to be favorably arranged around the outside diameter of stator assembly 16; arranging the boards of controller assembly 38 to separate heat making devices onto separate boards; and separating controller assembly 38 into major functions which can be built on separate boards. Using separate circuit boards having distinct functions enables the individual boards of controller assembly 38 to be updated without affecting the entire controller assembly 38. Such updates can be necessitated by end users, new components, cost savings, or obsolescence of current components.

In the exemplary embodiment, circuit board 128 is oriented substantially parallel, or planar with respect to inner surface 96 of cover 54. As such, controller assembly 38 is not oriented axially with respect to electrical machine 10. Alternatively, controller assembly 38 is oriented axially with respect to electrical machine 10. In the exemplary embodiment, circuit board 128 is generally C-shaped to facilitate fitting within cooling channel 102 of cover 54. Circuit board 128 includes a plurality of mounting holes 134 formed therethrough, including at least one mounting hole 134 located at each end of circuit board 128. A fastener 136 is passed through each hole 134 and coupled to cover 54 via mounting bosses 104 to secure circuit board 128 in place. The user then attaches the necessary inputs to circuit board 128, for example, without limitation, an AC input connection through power connector 132, a serial communication connection through user input connector 130, and any additional discrete input/output digital or analog connections.

In the exemplary embodiment, circuit board 128 is covered by a potting material 138 (shown in FIG. 4) after the circuitry components are attached. Potting material 138 protects the circuitry components on circuit board 128. Potting material 138 also provides additional support for circuit board 128. At least one insulator (not shown) functions to insulate electrical connections on circuit board 128 from cover 54. In the exemplary embodiment, potting material 138 substantially covers circuit board 128 and has an upper surface substantially coincident with length $L_2$ of curved wall 94.

In operation, rotor assembly 18 rotates about rotation axis 24 to draw airflow 140 into housing 52 through intake opening 90. The amount of air moved by electrical machine 10 increases as a point on rotor 40 moves in a counterclockwise direction with reference to FIG. 11 within housing 52 from location C towards location D, which corresponds to an outlet of inner chamber portion 100 and an inlet to cooling channel 102. Curved wall 94 is positioned progressively further away from rotor 40 in the direction of rotation of rotor 40 to accommodate the increasing volume of air due to the volute shape of cover 54. Rotor 40 generates high velocity airflow 140 that is exhausted from air outlet portion 86 of cover 54. Rotor 40 draws airflow 140 into housing 52 through intake opening 90 in the axial direction of electrical machine 10 (referring to rotation axis 24) and turns airflow 140 to a generally radial direction (referring to a radial direction generally perpendicular to rotation axis 24), such that airflow 140 passes between blades 118 and is pushed outward due to centrifugal force generated by the rotating blades 118. The rapid change in direction of airflow 140 causes differences in the airflow velocity and pressure between the portion of airflow 140 flowing through intake opening 90 and the portion within cover 54. These pressure and velocity differences cause a portion of airflow 140 to recirculate through stator assembly 16, passing through spaces between copper windings 36, thereby facilitating cooling of stator assembly 16. The recirculating airflow 140 then passes through holes 126 formed through rotor 40 where it combines with incoming airflow 140 and is again pushed radially outward by blades 118.

As shown in FIG. 11, airflow 140 is accelerated in a circumferential direction due to the volute shape of curved wall 94 and the forces generated on airflow 140 by rotor 40, and in particular blades 118. Airflow 140 passes through inner chamber portion 100 and into cooling channel 102 at location D. As airflow 140 passes through cooling channel 102, it impacts heat making components of circuit board 128, and thereby facilitates cooling circuit board 128 via forced convection cooling. Airflow 140 continues through cooling channel 102 until it is exhausted through air outlet portion 86 of cover 54.

The present disclosure provides an electrical machine having a housing configured to facilitate cooling of an integrated control assembly. More specifically, an electrical machine is disclosed that includes a volute-shaped housing and a plurality of integrally formed fan blades on a rotor of the electrical machine. The rotor assembly draws cooling air into the housing and accelerates is in a centrifugal direction, such that the velocity and pressure of the cooling airflow is increased. A portion of the airflow is forced through the stator assembly by the increased pressure of the accelerated airflow. This portion is recirculated through the stator assembly and back into the main cooling airflow. The cooling airflow is forced through a cooling channel formed in the housing of the electrical machine such that it passes over the integrated control assembly. The forced airflow facilitates cooling the control assembly by forced convection. The electrical machine includes a substantially planar controller assembly coupled radially outward from the stator assembly. The controller assembly enables a low profile housing to cover the electrical machine and the controller assembly such that the housing extends a minimal distance about the stator and rotor assemblies. As such, the electrical machine takes up less space within a fluid circulating system and provides for additional space for additional system components. Furthermore, the electrical machine contains fewer overall components due to integration of the fan components directly on the rotor, which provides for an electrical machine that is less expensive and easier to assemble than other known electrical machines. Thus, the apparatus, methods, and systems described herein provide electrical machine having increased cooling of the controller assembly. The exemplary embodiments described herein provide apparatus, systems, and methods particularly well-suited for forced draft system motors.

Exemplary embodiments of an electrical machine are described above in detail. The methods and apparatus are not limited to the specific embodiments described herein, but rather, components of apparatus and/or steps of the methods may be utilized independently and separately from other components and/or steps described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A housing for an electrical machine having a rotation axis, a rotor assembly including a rotor, and a controller assembly, the rotor assembly including at least one bearing assembly, said housing comprising:
   an endshield comprising an annular center section comprising a bore sized to couple to the at least one bearing assembly; and
   a cover coupled to said endshield and comprising:
      a generally axially-extending flange wall formed about a perimeter of said cover;
      a volute-shaped inner chamber configured to at least partially enclose the rotor coupled to the rotor assembly of the electrical machine;
      a cooling channel positioned radially outward from said inner chamber, said cooling channel configured to at least partially enclose the controller assembly of the electrical machine; and
      a volute-shaped curved wall that extends axially from an inner surface of said cover, said curved wall at least partially defining said inner chamber and said cooling channel.

2. The housing in accordance with claim 1, wherein said cover further comprises an air outlet portion formed at an end of said cooling channel to provide open communication between said cooling channel and an environment exterior to said cover.

3. The housing in accordance with claim 2, wherein said air outlet opening comprises at least one through-opening disposed in directional alignment with a path of airflow through said cover.

4. The housing in accordance with claim 3, wherein said at least one through-opening comprises at least one elongate slot disposed in said flange wall.

5. The housing in accordance with claim 1, wherein said cooling channel comprises a volute-shaped cooling channel.

6. The housing in accordance with claim 1, wherein said cover further comprises an annular intake opening formed substantially concentric with the rotation axis of the electrical machine.

7. The housing in accordance with claim 6, wherein said annular intake opening comprises a latticework extending across said intake opening to form an open framework of material configured to enable air to pass through.

8. The housing in accordance with claim 1, wherein said curved wall extends circumferentially about the rotation axis of the electrical machine forming an increasing expansion angle for airflow.

9. An electrical machine comprising:
   a rotor assembly comprising a rotor coupled to a rotor shaft defining a rotation axis, said rotor assembly further comprising at least one bearing assembly;
   a stator assembly comprising a stator core and a plurality of windings;
   a housing comprising an endshield comprising an annular center section comprising a bore sized to couple to the at least one bearing and a cover coupled to said endshield, said cover comprising:
      a generally axially-extending flange wall formed about a perimeter of said cover;
      a volute-shaped inner chamber configured to at least partially enclose said rotor of said rotor assembly;
      a cooling channel positioned radially outward from said inner chamber, said cooling channel configured to at least partially enclose a controller assembly of said electrical machine; and
      a volute-shaped curved wall that extends axially from an inner surface of said cover, said curved wall at least partially defining said inner chamber and said cooling channel; and a controller assembly coupled to said housing, wherein said controller assembly is positioned radially outward from said rotor and located in said cooling channel.

10. The electrical machine in accordance with claim 9, wherein said rotor is disk-shaped and has a diameter that is less than a minimum radius of said curved wall.

11. The electrical machine in accordance with claim 9, wherein said rotor comprises a first surface substantially perpendicular to the rotation axis, and a plurality of blades formed on said first surface and extending axially from said first surface.

12. The electrical machine in accordance with claim 11, wherein each blade of said plurality of blades is substantially straight and extends substantially radially from the rotation axis.

13. The electrical machine in accordance with claim 11, wherein each blade of said plurality of blades comprises one of a backward inclined blade, a backward curved blade, a forward inclined blade, a forward curved blade, and an airfoil-shaped blade.

14. The electrical machine in accordance with claim 9, wherein said cooling channel comprises a volute-shaped cooling channel.

15. The electrical machine in accordance with claim 9, wherein said rotor comprises at least one axially-extending opening disposed adjacent a hub portion of said rotor, wherein said at least one opening is configured to enable air to pass through said rotor during operation of said electrical machine.

16. The electrical machine in accordance with claim 15, wherein said at least one opening comprises a plurality of openings equi-spaced about the hub portion of said rotor.

17. The electrical machine in accordance with claim 15, wherein a radially outer edge of said at least one opening generally corresponds to a radially inner edge of an opening formed in said stator assembly.

18. A method of assembling an electrical machine, said method comprising:
providing an endshield including an annular center section having a bore sized to couple to at least one bearing assembly;
coupling a rotor assembly to the endshield to enable rotation of the rotor assembly with respect to the endshield, the rotor assembly including the at least one bearing assembly and a rotor having a plurality of blades formed thereon;
providing a cover including a generally axially-extending flange wall formed about a perimeter of the cover, a volute-shaped inner chamber configured to at least partially enclose the rotor, a cooling channel positioned radially outward from the inner chamber, and a volute-shaped curved wall that extends axially from an inner surface of the cover, the curved wall at least partially defining the inner chamber and the cooling channel; and
coupling the cover to the endshield to substantially enclose the rotor therein.

19. The method in accordance with claim 18, further comprising coupling a controller assembly to the cover, wherein the controller assembly is positioned radially outward from the rotor and is located in the cooling channel, wherein the curved wall is configured to substantially isolate the rotor from the controller assembly within the cover.

\* \* \* \* \*